(12) United States Patent
Isaji et al.

(10) Patent No.: US 7,188,604 B2
(45) Date of Patent: Mar. 13, 2007

(54) INTERNAL COMBUSTION ENGINE AIR INTAKE STRUCTURE

(75) Inventors: Hiroshi Isaji, Yokohama (JP); Kouichi Mori, Ayase (JP); Shunichi Mitsuishi, Isehara (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/214,793

(22) Filed: Aug. 31, 2005

(65) Prior Publication Data
US 2006/0048739 A1 Mar. 9, 2006

(30) Foreign Application Priority Data
Sep. 7, 2004 (JP) ............................. 2004-259651
Sep. 8, 2004 (JP) ............................. 2004-260624

(51) Int. Cl.
*F02D 9/08* (2006.01)
*F02B 31/06* (2006.01)

(52) U.S. Cl. ...................................... 123/337; 123/308

(58) Field of Classification Search ................ 123/306, 123/308, 184.56, 590, 592, 593, 336, 337
See application file for complete search history.

(56) References Cited

U.S. PATENT DOCUMENTS

| | | | |
|---|---|---|---|
| 4,271,795 A | 6/1981 | Nakagawa et al. | |
| 4,323,038 A | 4/1982 | Motosugi et al. | |
| 4,465,034 A | 8/1984 | Tsutsumi | |
| 4,543,931 A | 10/1985 | Hitomi et al. | |
| 4,612,903 A | 9/1986 | Urabe et al. | |
| 5,273,014 A * | 12/1993 | Mitobe et al. | ............... 123/336 |
| 5,295,464 A * | 3/1994 | Ando et al. | .................. 123/308 |
| 5,551,392 A * | 9/1996 | Yamaji et al. | .............. 123/306 |
| 5,592,917 A * | 1/1997 | Kim | ........................... 123/308 |
| 5,632,244 A | 5/1997 | Endres et al. | |
| 5,640,941 A * | 6/1997 | Hazen et al. | ................ 123/306 |
| 6,394,066 B1* | 5/2002 | Chou et al. | .................. 123/308 |
| 6,575,133 B2* | 6/2003 | Ries-Mueller et al. | ...... 123/306 |
| 6,705,280 B1* | 3/2004 | Lippert | ........................ 123/306 |
| 6,712,038 B2* | 3/2004 | Hiraku et al. | ................ 123/306 |
| 6,761,140 B2 | 7/2004 | Herold et al. | |
| 6,805,087 B2 | 10/2004 | Yakabe et al. | |

(Continued)

FOREIGN PATENT DOCUMENTS

JP  5-57319 U  7/1993

(Continued)

*Primary Examiner*—Hai Huynh
(74) *Attorney, Agent, or Firm*—Global IP Counselors, LLP

(57) ABSTRACT

An air intake structure is provided with an air intake control valve disposed in the air intake passage. The air intake control valve has a valve element pivotally mounted at one end adjacent to a passage wall of the air intake passage. The air intake control valve is configured to control a gas flow based on the rotational position of the valve element. A horizontal partitioning plate extends along the flow direction of an intake air. The horizontal partitioning plate can be stationary or moveable with the valve element. The valve element has a swirl-producing notch and a vertical partitioning plate extends substantially perpendicular to the horizontal partitioning plate from a position corresponding to a vertical side edge of the swirl-producing notch when the air intake control valve is fully closed. The vertical partitioning plate can be stationary or moveable with the valve element.

20 Claims, 11 Drawing Sheets

U.S. PATENT DOCUMENTS

| | | | |
|---|---|---|---|
| 6,827,060 B2* | 12/2004 | Huh | 123/336 |
| 6,874,465 B2 | 4/2005 | Arimatsu et al. | |
| 7,089,909 B2* | 8/2006 | Moschini et al. | 123/306 |
| 2005/0155570 A1* | 7/2005 | Confer et al. | 123/306 |
| 2006/0048738 A1* | 3/2006 | Isaji et al. | 123/184.56 |

FOREIGN PATENT DOCUMENTS

| | | |
|---|---|---|
| JP | 5-71445 U | 9/1993 |
| JP | 5-87255 U | 11/1993 |
| JP | 7-25264 U | 5/1995 |

* cited by examiner

INTERNAL COMBUSTION ENGINE AIR INTAKE STRUCTURE

CROSS-REFERENCE TO RELATED APPLICATIONS

This application claims priority under 35 U.S.C. § 119 to Japanese Patent Application Nos. 2004-259651 and 2004-260624. The entire disclosures of Japanese Patent Application Nos. 2004-259651 and 2004-260624 are hereby incorporated herein by reference.

BACKGROUND OF THE INVENTION

1. Field of the Invention

The present invention generally relates to an air intake structure especially for an internal combustion engine. More specifically, the present invention relates to an internal combustion engine air intake structure that is configured to change the flow of the intake air into a combustion chamber.

2. Background Information

One known method of producing tumbling of the fuel-air mixture in a reliable manner is to provide a partition wall inside a passageway of an intake port to divide the passage into a first passage and a second passage and provide an air intake control valve (shutter valve) that can open and close the second passage. When the air intake control valve is closed, the free outermost edge of the air intake control valve touches against the partition wall and deflects the intake air to flow through the first passage, thereby causing a tumbling motion to occur. An example of an air intake structure employing such arrangement is disclosed in Japanese Laid-Open Patent Publication No. 7-25264.

In view of the above, it will be apparent to those skilled in the art from this disclosure that there exists a need for an improved air intake structure for an internal combustion engine. This invention addresses this need in the art as well as other needs, which will become apparent to those skilled in the art from this disclosure.

SUMMARY OF THE INVENTION

It has been discovered that since the partition wall provided in the device described in the aforementioned publication is a horizontal plate, a tumble flow can be reliably produced. However, a stable swirl flow sometimes cannot be produced when this type of air intake control valve is used as a swirl control valve because the gas flow becomes turbulent. Moreover, since the device described in the aforementioned publication only has one partition wall, the air intake control valve can only be used in one of two different valve opening states. In other words, this type of air intake control valve only has an open state in which the second passage is fully open and a closed state in which the second passage is fully closed. Consequently, it is difficult to obtain gas flows of various strengths based on the operating conditions of the engine.

The present invention was conceived in view of these problems. One object of the present invention is to provide an air intake structure that can produce a stable swirl flow. Another object of the present invention is to provide an air intake structure that can obtain gas flows of various strengths by varying the opening degree of the air intake control valve and that can ensure a stable gas flow regardless of the opening degree to which the air intake control valve is set.

In order to achieve the objects, the present invention provides an internal combustion engine air intake structure that basically comprises an air intake passage, an air intake control valve, a first partitioning member and a second partitioning member. The air intake passage has an internal passage wall. The air intake control valve is disposed in the air intake passage to selectively move between a retracted position and an intake air deflecting position about a rotational axis that is positioned on one side of the air intake passage in a position closely adjacent to the internal passage wall of the air intake passage. The air intake control valve includes a valve element with an inner end located at the rotational axis and an outer end having a swirl-producing notch with a bottom edge and a side edge. The first partitioning member is longitudinally arranged within the air intake passage to generally extend parallel to an intake air flow direction of the intake air from a position corresponding to the bottom edge formed by the swirl-producing notch of the valve element when the air intake control valve is in the intake air deflecting position. The second partitioning member is arranged to form an angle with respect to the first partitioning member and to extend along the intake air flow direction from the side edge formed by the swirl-producing notch of the valve element, when the air intake control valve is in the intake air deflecting position.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
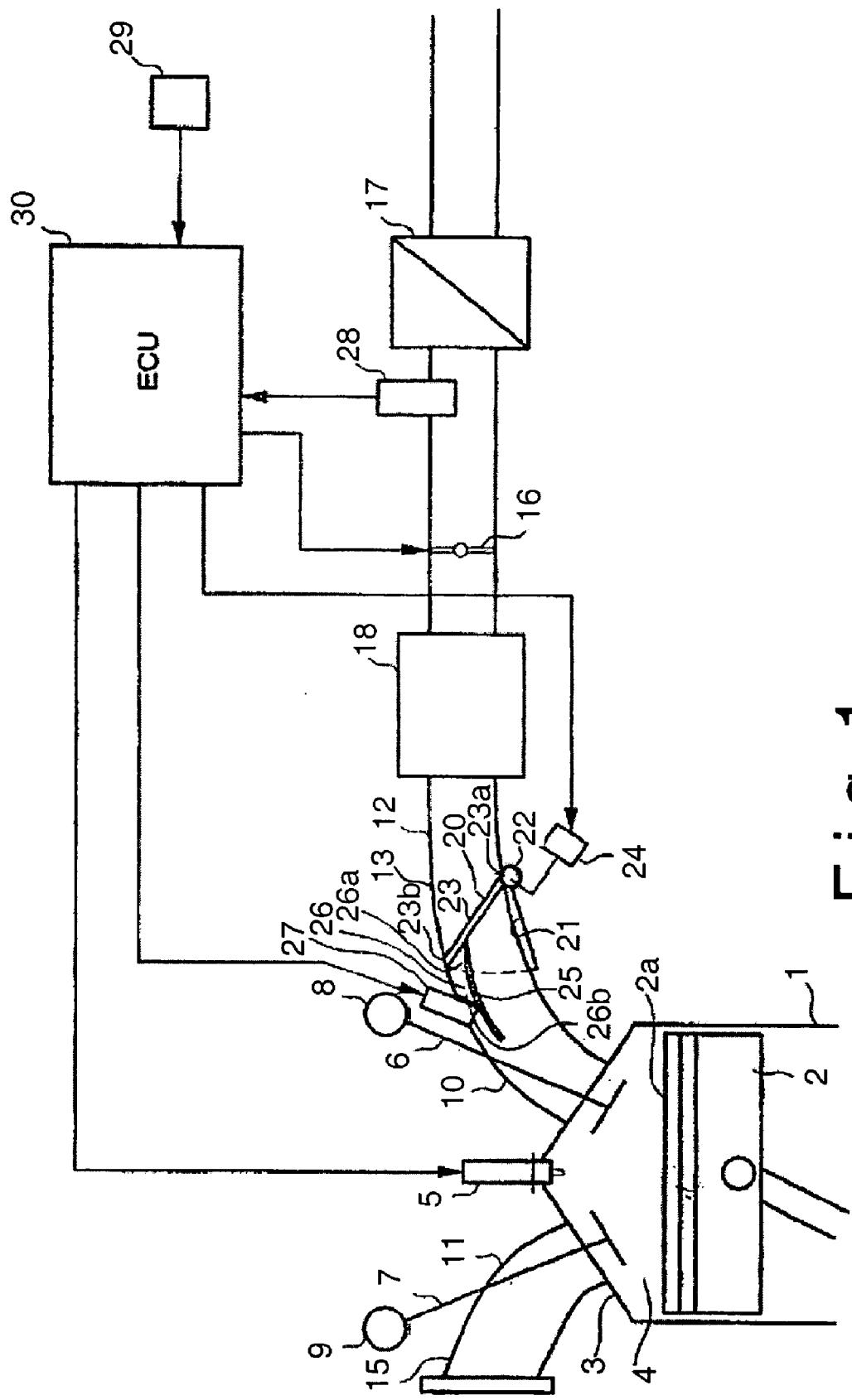
FIG. 1 is a simplified schematic view of a portion of an internal combustion engine with an air intake structure in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. In addition, in the following embodiments, overlapping description will be omitted by assigning the same reference numerals to the same elements.

First Embodiment

Referring initially to FIG. 1, a portion of an internal combustion engine is schematically illustrated that is configured with an air intake structure in accordance with a first embodiment of the present invention. The internal combustion engine basically includes a plurality of (e.g., four) cylinders 1 (only one shown in figure) with a piston 2 arranged inside of each of the cylinders 1 to reciprocate in a conventional manner. The cylinders 1 are formed in an engine block that has a cylinder head 3 mounted to overlie each of the cylinders 1. Thus, a top surface 2a of each of the pistons 2 and a portion of the cylinder head 3 above each of the cylinders 1 form a combustion chamber 4. A spark plug 5 is arranged in the cylinder head 3 above each of the combustion chambers 4.

Two intake valves 6 and two exhaust valves 7 are arranged in each of the combustion chambers 4. The intake valves 6 and the exhaust valves 7 are opened and closed by a pair of valve operating mechanisms 8 and 9, respectively, in a conventional manner.

Dual input ports 10 and dual exhaust ports 11 (only one of each shown in FIG. 1) are arranged on opposite sides of each of the combustion chambers 4. An intake manifold 12 is connected to each of the air intake ports 10 of each of the combustion chambers 4 so as to form a plurality of intake passages 13 (only one shown in FIG. 1) for supplying intake air individually to each of the combustion chambers 4. Also an exhaust manifold (not shown) is connected to the exhaust ports 11 of each of the combustion chambers 4 so as to form a plurality of exhaust passages 15 (only one shown in FIG. 1) for removing exhaust air individually to each of the combustion chambers 4.

A throttle valve 16 is arranged upstream of the intake manifold 12 to regulate the flow of fresh air into the intake passages 13. Fresh air is drawn in through an air cleaner 17 arranged upstream of the throttle valve 16 in accordance with the open/close control of the throttle valve 16.

A collector 18 is arranged downstream of the throttle valve 16 and serves to distribute intake air to each of the cylinders 1 through the intake manifold 12, which is connected to the collector 18.

Figure 2:
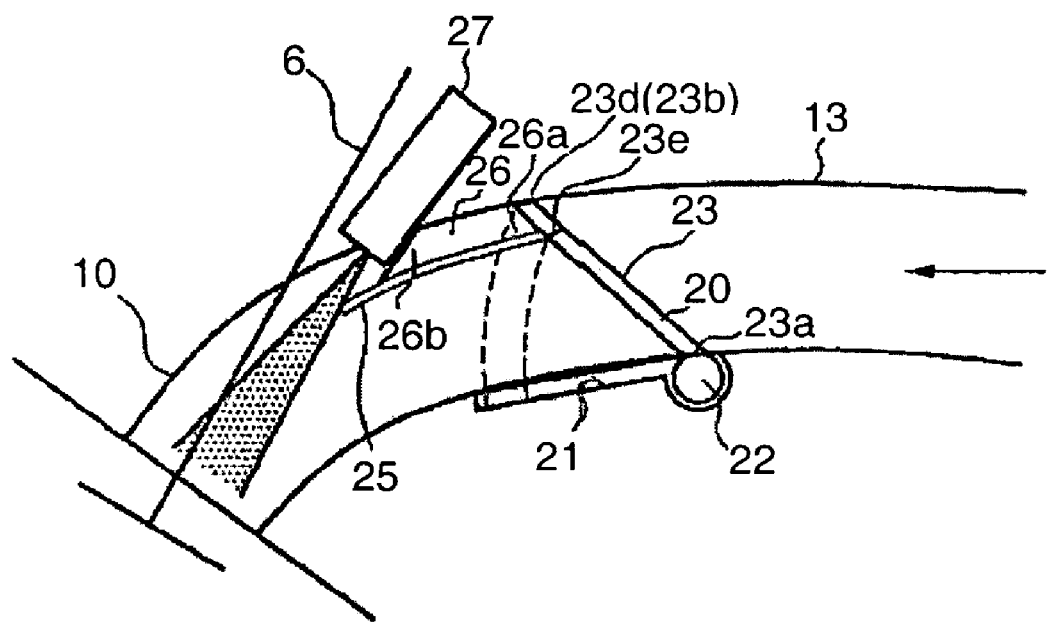
FIG. 2 is an enlarged, simplified longitudinal cross sectional view of a portion of the air intake passage illustrated in FIG. 1 in accordance with the first embodiment of the present invention.
Figure 3:
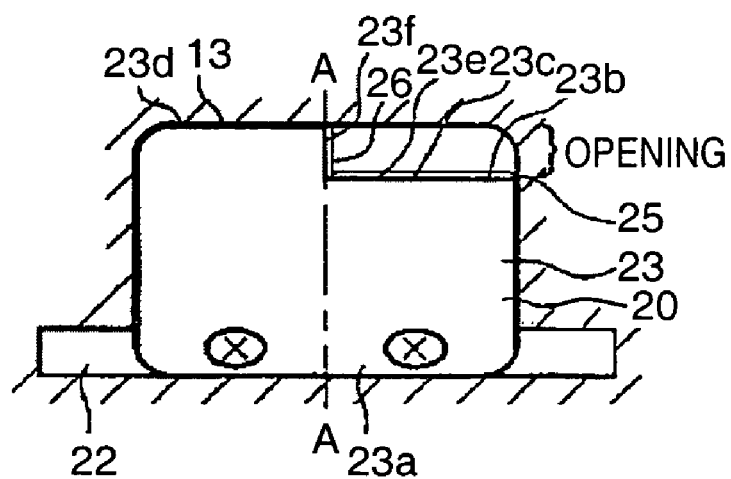
FIG. 3 is a simplified transverse cross sectional view of the portion of the air intake passage illustrated in FIG. 2 in accordance with the first embodiment of the present invention.

Each of the intake passages 13 has an air intake control valve 20 disposed therein for deflecting the intake air to one side of the air intake passage 13. Preferably, a portion of the bottom surface of the internal passage wall is provided with a recess or cavity that forms a storage compartment 21 for storing the air intake control valve 20. As shown in FIG. 2, the air intake control valve 20 is pivotally attached to the passage wall of the air intake passage 13 by a valve shaft 22. In other words, the air intake control valve 20 is a flap valve having the valve shaft 22 arranged in a turnable fashion in a prescribed position of the storage compartment 21. The valve shaft 22 forms a pivot or rotational axis that is disposed in a position closely adjacent to the passage wall in a section of the air intake passage 13 (e.g., in the intake manifold 12). Preferably, the rotational axis of the valve shaft 22 is located on a portion of the bottom surface of the passage wall such that the valve shaft 22 is outside of the air flow path of the air intake passage 13. The air intake control valve 20 preferably has a plate-like valve element 23 that is fixed to the valve shaft 22 at the inner end 23a thereof. The air intake control valve 20 has an outer end 23b with a swirl-producing notch 23c is formed on the right side of the outer end 23b and a free outermost edge 23d formed on the left side of the outer end 23b as seen in FIG. 3. The swirl-producing notch 23c is formed on the outer end 23b of the valve element 23 so as to define a bottom edge 23e and a side edge 23f. The swirl-producing notch 23c is formed by cutting away a portion of the valve element 23 ranging from a center position (line A—A) to the right side of the valve element 23.

The valve shaft 22 of the air intake control valve 20 can be turned (rotated) by an actuator 24 (servomotor). Thus, the opening and closing of the air intake passage 13 is controlled by operating the actuator 24 and, thereby, controlling the rotational position of the valve shaft 22. When the valve shaft 22 is turned, the free outermost edge 23d of the outer end 23b of the valve element 23 moves along a circular arc (rotational path or arc) centered on the valve shaft 22. For example, when the air intake control valve 20 is fully open, i.e., when the valve element 23 of the air intake control valve 20 is in a retracted positioned so as to be parallel to the air intake passage 13, the entire air intake control valve 20 is housed in the storage compartment 21. In this fully open state, the flow resistance with respect to the intake air is reduced.

A horizontal partitioning plate or member 25 is arranged inside the air intake passage 13 (e.g., in the intake port 10) as a member for regulating the flow of the intake air. The horizontal partitioning plate 25 is a horizontal plate-like member that is arranged so as to be oriented along the flow direction of the intake air in the air intake passage 13 and configured to have rectifying effect with respect to the flow of the intake air. In other words, the horizontal partitioning plate 25 is arranged longitudinally within the air intake passage 13 so as to extend along the flow direction of the intake air. When the valve shaft 22 of the air intake control valve 20 is at a prescribed rotational position, i.e., when the air intake control valve 20 is in the fully closed state (intake air deflecting position) as shown in FIGS. 1 and 2, the horizontal partitioning plate 25 forms a continuous contour with respect to the outer edge (bottom edge 23e) of the side of the outer end 23b of the valve element 23 where the swirl-producing notch 23c is formed. In other words, the horizontal partitioning plate 25 is arranged so as to extend along the flow direction of the intake air from a position corresponding to the position where the bottom edge 23e formed by the swirl-producing notch 23c of the valve element 23 is located.

Meanwhile, the free outermost edge 23d of the side of the outer end 23b of the valve element 23 where the swirl-producing notch 23c is not formed touches against the wall face of the air intake passage 13.

A vertical partitioning plate or member 26 is arranged inside the air intake passage 13 (e.g., in the intake port 10) as a member for controlling the flow of the intake air when the horizontal partitioning plate 25 is moved to a closed state. The vertical partitioning plate 26 is a vertical plate-like member that is arranged so as to form an angle (substantially perpendicular angle) with respect to the horizontal partitioning plate 25 in a position corresponding to the side edge 23f formed by the swirl-producing notch 23c formed in the valve element 23. In FIGS. 1 and 2, the vertical partitioning plate 26 is arranged longitudinally within the air intake passage 13 in such a manner as to extend along the flow direction of the intake air and exists only on the upper side (perpendicularly above) the horizontal partitioning plate 25. The vertical partitioning plate 26 is arranged so as to extend along the flow direction of the intake air from a position corresponding to the position where the side edge 23f formed by the swirl-producing notch 23c of the valve element 23 is located. The downstream edges of the horizontal and vertical partitioning plates 25 and 26 are located in a vicinity of the combustion chamber 4 (i.e., the vicinity of the intake valve 6).

As shown in FIG. 3, the vertical partitioning plate 26 is positioned slightly off the centerline (line A—A) of the valve element 23 of the air intake control valve 20 so that the upstream end or edge 26a on the upstream side of the vertical partitioning plate 26 does not interfere with the side edge 23f when the air intake control valve 20 is opened and closed. The upstream front end 26a of the vertical partitioning plate 26 is positioned and configured such that aligns with the side edge 23f of the valve element 23 when the air intake control valve 20 is fully closed, and the downstream end or edge 26b of the vertical partitioning plate 26 is positioned in the vicinity of a fuel injection valve 27 arranged in the air intake passage 13. The fuel injection valve 27 is provided in a downstream portion of the air intake passage 13 at a position upstream of the branch point where the air intake passage 13 branches into two intake ports 10. In this embodiment, the downstream edges of the horizontal and vertical partitioning plates 25 and 26 are located so as not to interfere with the fuel stream of the fuel injection valve 27.

As shown in FIG. 3, the horizontal partitioning plate 25 and the vertical partitioning plate 26 are arranged so as to form a substantially perpendicular L shape. As a result, the plate-like members 25 and 26 are in positions corresponding to the swirl-producing notch 23c formed in the valve element 23 when the air intake control valve 20 is fully closed. Intake air passes through the swirl-producing notch 23c and is guided by the horizontal partitioning plate 25 and the vertical partitioning plate 26 such that the intake air forms a swirl flow inside the cylinder 1 without the flow becoming turbulent.

Various sensors are also provided to detect the operating conditions of the engine. For example, as shown in the FIG. 1, an air flow meter 28 (intake air detection sensor) is provided in the air intake passage 13 at a position upstream of the throttle valve 16, and a crank angle sensor 29 is provided to output a signal corresponding to the rotational speed of the engine. The actuator 24 (i.e., the rotational position of the valve shaft 22) is controlled based on engine operating conditions such as engine rotational speed detected by these sensors 28 and 29 and or other sensors.

In particular, the output signals of these sensors 28 and 29 are fed to an engine control unit ("ECU") 30, where they are used in various computations and control operations. The engine control unit 30 preferably includes a microcomputer with a control program that controls the operation of the engine. For example, the engine control unit 30 is configured and programmed to control the spark ignition timing of the spark plugs 5, the opening degree of the throttle valve 16, the actuator 24 (i.e., the rotational position of the valve shaft 22), and the fuel injection from the fuel injection valve 27. The engine control unit 30 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the engine control unit 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The relationship between the opening and closing of the air intake control valve 20 and the load (operating conditions) of the engine in this embodiment will now be explained. When the engine is operating in a low rotational speed/low load region, the air intake control valve 20 is closed fully. When the air intake control valve 20 is fully closed, the bottom edge 23e and the side edge 23f formed by the swirl-producing notch 23c of the valve element 23 form a continuous contour with respect to with the horizontal partitioning plate 25 and the vertical partitioning plate 26, which are arranged in an L-shaped manner. Since the horizontal partitioning plate 25 and the vertical partitioning plate 26 are configured and arranged to extend along the flow direction of the intake air inside the air intake passage 13, the intake air is delivered into the cylinder 1 in such a manner that a strong swirl flow is produced without causing the gas flow to become turbulent.

When the engine is operating in a medium rotational speed/medium load region, the air intake control valve 20 is opened partially to an opening degree that is determined in accordance with the sizes of the rotational speed and the load.

When the engine is operating in a high rotational speed/high load region, the air intake control valve 20 is fully opened. When the air intake control valve 20 is fully opened, the air intake control valve 20 (valve element 23) is stored in the storage compartment 21 formed in the bottom surface of the internal passage wall of the air intake passage 13 and the flow resistance with respect to the intake air is reduced.

Consequently, when the valve shaft 22 is in a prescribed rotational position (e.g., the position shown in FIG. 3), the horizontal partitioning plate 25 and the vertical partitioning plate 26 (which extend along the flow direction of the intake air) form a continuous contour with respect to the swirl-producing notch 23c of the valve element 23 of the air intake control valve 20. As a result, the intake air passing through the air intake control valve 20 can be delivered into the cylinder 1 in a stable manner, enabling exhaust emissions to be greatly reduced and the fuel economy to be improved.

In this embodiment, the horizontal partitioning plate 25 and the vertical partitioning plate 26 form a generally perpendicular L shape in a cross sectional view of the air intake passage 13 lying in a plane perpendicular to the flow direction of the intake air. As shown in FIG. 3, when the air intake control valve 20 is fully closed, a passage corresponding to the swirl-producing notch 23c is formed and a stable swirl flow can be produced.

Also in this embodiment as mentioned above, when the air intake control valve 20 is fully closed, an upstream front edge part 26a of the vertical partitioning plate 26 is aligned with the side edge 23f formed by the swirl-producing notch 23c. As a result, the flow of intake air does not easily become turbulent and a stable gas flow can be ensured.

Finally, in this embodiment as mentioned above, a portion of the air intake passage 13 is cut away (recess) to form the storage compartment 21 for storing the air intake control valve 20. As a result, the flow resistance with respect to the intake air can be reduced by storing the air intake control valve 20 (valve element 23) in the storage compartment 23.

Second Embodiment

Figure 4:
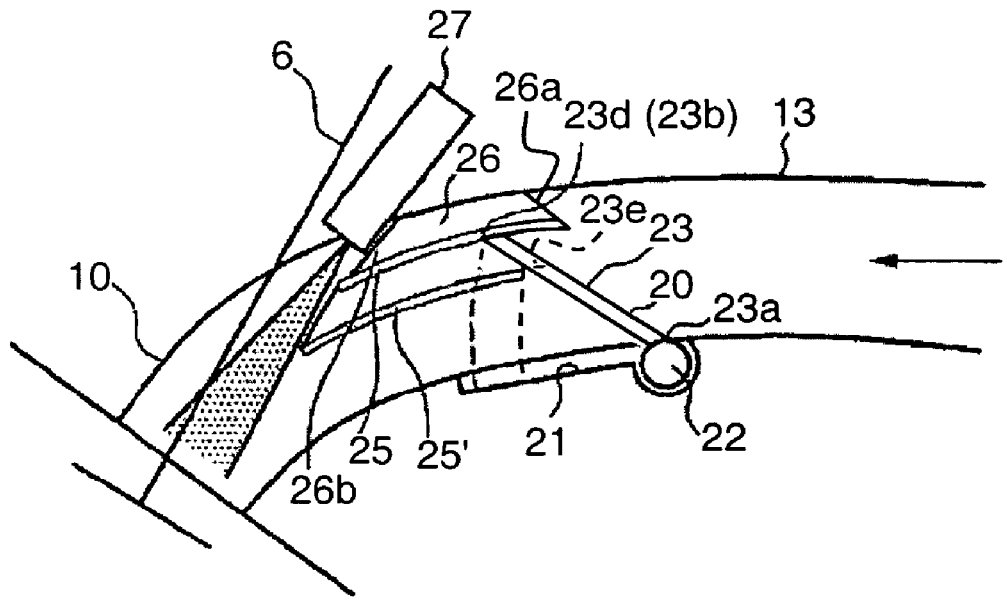
FIG. 4 is an enlarged, simplified longitudinal cross sectional view of a portion of an air intake passage that uses two horizontal plate-like members in accordance with a second embodiment of the present invention.
Figure 5:
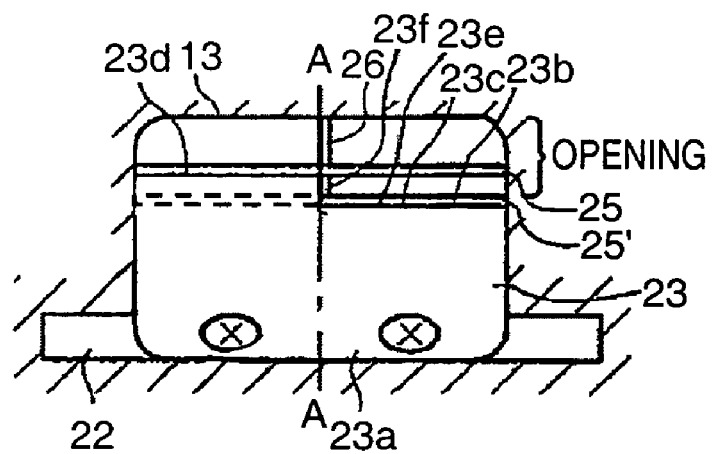
FIG. 5 is a simplified transverse cross sectional view of the portion of the air intake passage illustrated in FIG. 4 in accordance with the second embodiment of the present invention.

Referring now to FIGS. 4 and 5, an air intake structure is illustrated in accordance with a second embodiment. This air intake structure of the second embodiment replaces the air intake structure of the first embodiment that is shown in FIG. 1. In other words, the air intake structure of the second embodiment is installed in the internal combustion engine of FIG. 1. In view of the similarity between this embodiment and the prior embodiments, the parts of the second embodiment that are identical to the parts of the first embodiment will be given the same reference numerals as the parts of the prior embodiments. Moreover, the descriptions of the parts of the second embodiment that are identical to the parts of the first embodiments may be omitted for the sake of brevity.

In the second embodiment, one supplemental horizontal partitioning plate 25' has been provided such that there are first and second horizontal partitioning plates 25 and 25'. Each of the first and second horizontal partitioning plates 25 and 25' are formed as a thin sheet member, arranged so as to be substantially parallel to each other and separated from each other by a prescribed distance in the vertical direction of the air intake passage 13.

The first and second horizontal partitioning plates 25 and 25' are configured such that they extend outwardly from the vertical partitioning plate 26 in the widthwise direction (rightward side and leftward side from the vertical partitioning plate 26 in FIG. 5). A notch is provided in the leftward extending side portion of each of the first and second horizontal partitioning plates 25 and 25' so that when the valve shaft 22 is rotated, the horizontal partitioning plates 25 and 25' will not interfere with the free outermost edge 23d of the side of the outer end 23b of the valve element 23 where the swirl-producing notch 23c is not formed. Each of the notches forms a continuous contour with respect to the free outermost edge 23d of the valve element 23 when the valve shaft 22 is at a prescribed rotational position. In other word the upstream ends of the first and second horizontal partitioning plates 25 and 25' are stepped shape to correspond to the stepped shape of the outer end 23b of the valve element 23.

The vertical partitioning plate 26 is arranged so as to extend downward inside the air intake passage 13 and is connected so as to be perpendicular to the first and second horizontal partitioning plates 25 and 25'. Consequently, the first and second horizontal partitioning plates 25 and 25' form an upside-down T shape with the vertical partitioning plate 26 in a cross sectional view of the air intake passage 13 lying in a plane perpendicular to the flow direction of the intake air. Also, as mentioned above, each of the first and second horizontal partitioning plates 25 and 25' has a notch formed on the leftward extending side portions such that first and second horizontal partitioning plates 25 and 25' will not interfere with the free outermost edge 23d of the side of the outer end 23b of the valve element 23 where the swirl-producing notch 23c is not formed.

The relationship between the opening and closing of the air intake control valve 20 and the load (operating conditions) of the engine in this embodiment will now be explained.

Similarly to the first embodiment, when the engine is operating in a low rotational speed/low load region, the air intake control valve 20 is closed fully to deliver the intake air into the cylinder 1 in such a manner that a strong swirl flow is produced.

When the engine is operating in a medium rotational speed/medium load region, the air intake control valve 20 is opened partially. In such a case, when the valve shaft 22 of the air intake control valve 20 is in a prescribe rotational position as shown in FIG. 5, the first horizontal partitioning plate 25 forms a continuous contour with respect to the free outermost edge 23d of the side (portion) of the outer end 23b of the valve element 23 where the swirl-producing notch 23c is not formed and the second horizontal partitioning plate 25' forms a continuous contour with respect to the bottom edge 23e of the side (portion) of the outer end 23b of the valve element 23 where the swirl-producing notch 23c is formed.

When the valve shaft 22 is in the prescribed rotational position, the intake air is directed into the cylinder 1 through an opening section comprising the passages located above the first horizontal partitioning plate 25 (the passages located to the left and right sides of the vertical partitioning plate 26 in FIG. 5) and the passage formed by the first horizontal partitioning plate 25, the second horizontal partitioning plate 25' and the vertical partitioning plate 26.

Since the first horizontal partitioning plate 25, the second horizontal partitioning plate 25', and the vertical partitioning plate 26 are all configured to follow the contour of the flow of intake air through the air intake passage 13, a swirl motion can be produced without causing the flow of the intake air to become turbulent when the air intake control valve 20 is set to this intermediate opening degree. As a result, exhaust emissions can be greatly reduced and the fuel economy can be improved.

When the engine is operating in a high rotational speed/high load region, the air intake control valve 20 is opened fully in the same manner as the first embodiment as seen in FIG. 3. When the air intake control valve 20 is fully opened, the air intake control valve 20 (valve element 23) is stored in the storage compartment 21 and the flow resistance with respect to the intake air is reduced.

Although this second embodiment illustrates an example in which there are two horizontal plate-like members, i.e., the first horizontal partitioning plate 25 and the second horizontal partitioning plate 25', the present invention is not limited to this number of horizontal plate-like members.

Third Embodiment

Figure 6:
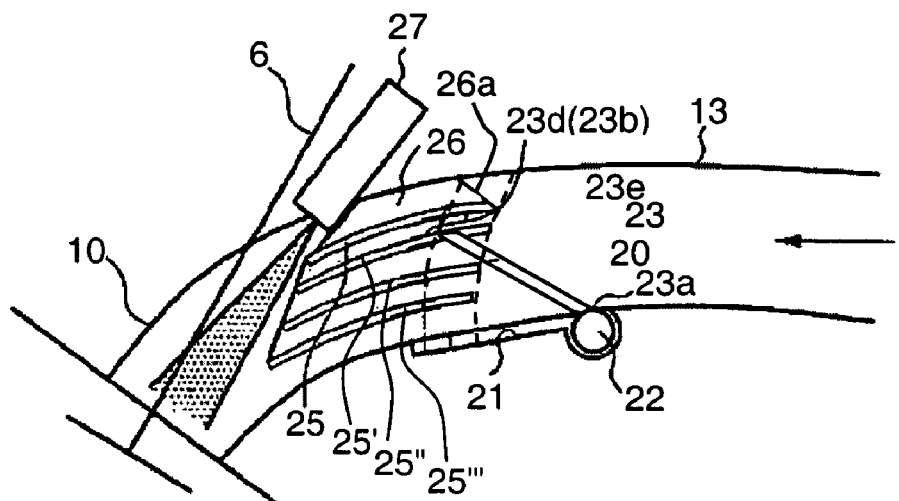
FIG. 6 is an enlarged, simplified longitudinal cross sectional view of a portion of an air intake passage that uses multiple horizontal plate-like members in accordance with a third embodiment of the present invention.
Figure 7:
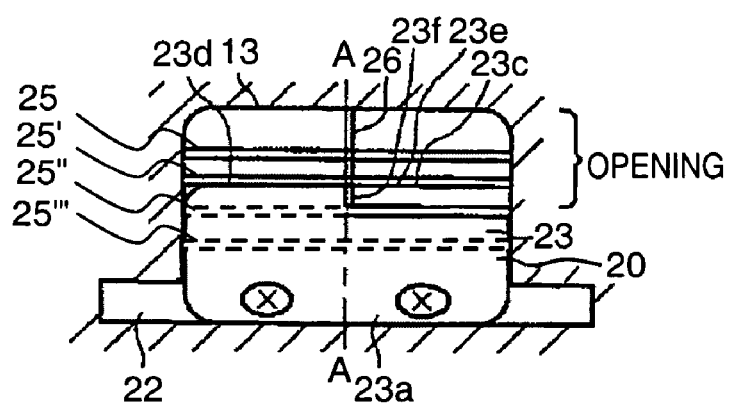
FIG. 7 is a simplified transverse cross sectional view of the portion of the air intake passage illustrated in FIG. 6 in accordance with the third embodiment of the present invention.

Referring now to FIGS. 6 and 7, an air intake structure is illustrated in accordance with a third embodiment. This air intake structure of the third embodiment replaces the air intake structure of the first embodiment that is shown in FIG. 1. In other words, the air intake structure of the third embodiment is installed in the internal combustion engine of FIG. 1. In view of the similarity between this embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

As shown in FIGS. 6 and 7, the air intake structure can be provided with a plurality (four) of horizontal partitioning plates 25, 25', 25" and 25'". Thus, the opening degree of the air intake control valve 20 can be controlled to anyone of a plurality of prescribed intermediate opening degrees based on the operating conditions (rotational speed and load) of the internal combustion engine, the prescribed opening degrees corresponding to rotational positions of the valve shaft 22 where the free outermost edge 23d of the valve element 23 each form a continuous contour with respect to a horizontal partitioning plate 25 such that a stable gas flow is produced without the flow of the intake air becoming turbulent.

Fourth Embodiment

Figure 8:
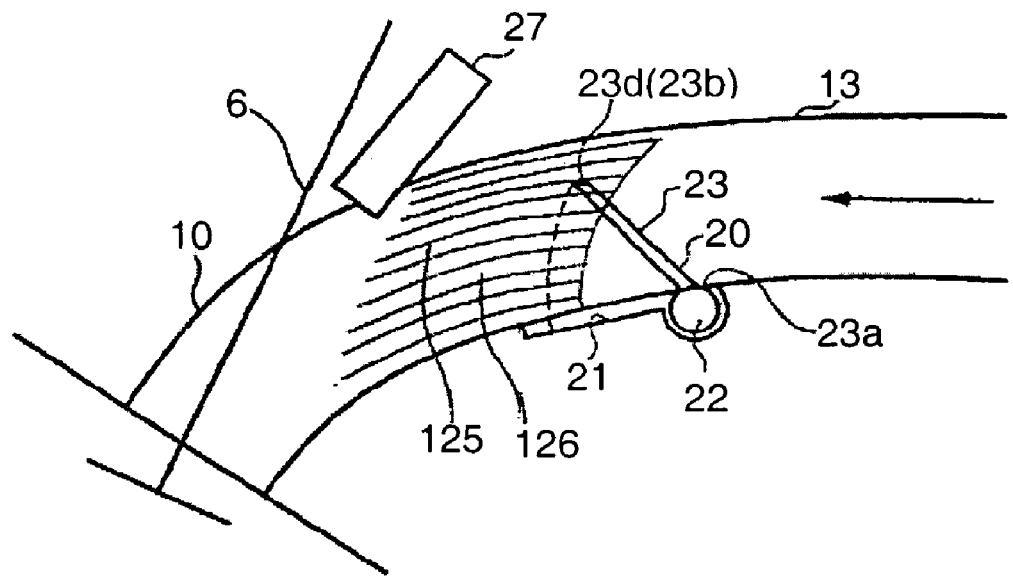
FIG. 8 is a simplified longitudinal cross sectional view of a portion of an air intake passage that uses a plurality of horizontal plate-like members and a plurality of vertical plate-like members that are arranged to form a honeycomb-like structure in accordance with a fourth embodiment of the present invention.
Figure 9:
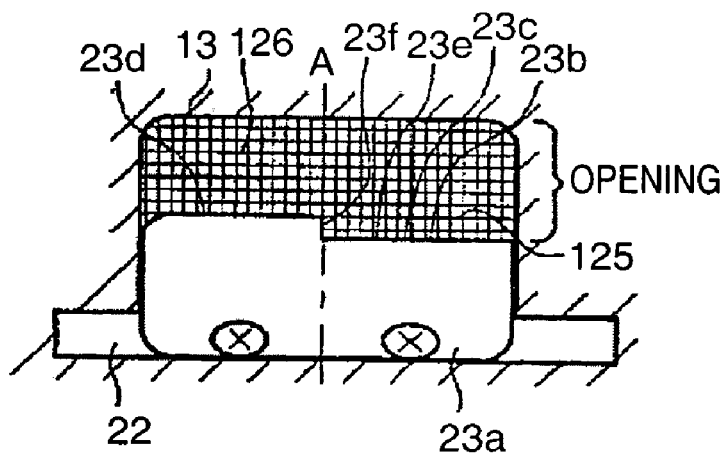
FIG. 9 is a simplified transverse cross sectional view of the portion of the air intake passage illustrated in FIG. 8 in accordance with the fourth embodiment of the present invention.

Referring now to FIGS. 8 and 9, an air intake structure is illustrated in accordance with a fourth embodiment. This air intake structure of the fourth embodiment replaces the air intake structure of the first embodiment that is shown in FIG. 1. In other words, the air intake structure of the fourth embodiment is installed in the internal combustion engine of FIG. 1. In view of the similarity between this embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

FIGS. 8 and 9 shows another example in which multiple horizontal partitioning plates 125 and multiple vertical partitioning plates 126 are provided so as to form a honeycomb-like structure. This structure, too, enables a stable gas flow to be produced without causing the intake air flow to become turbulent. The flow resistance against the intake air can be reduced by making the horizontal partitioning plates 125 and vertical partitioning plates 126 out of a thin sheet-like material.

In this embodiment, the horizontal partitioning plates 125 lie in planes generally parallel to the flow direction of the intake air, while the vertical partitioning plates 126 in planes generally parallel to the flow direction but perpendicular to the horizontal partitioning plates 125. Also, each of the horizontal partitioning plates 125 is provided with a notch formed such that when the valve shaft 22 is rotated, the horizontal partitioning plates 125 will not interfere with the free outermost edge 23d of the side of the outer end 23b of the valve element 23 where the swirl-producing notch 23c is not formed. As a result, the valve element 23 does not interfere with (bump into) the horizontal partitioning plates 125 when the air intake control valve 20 is rotated.

In this embodiment, at least one supplemental horizontal plate-like member is provided so as to be substantially perpendicular to the vertical partitioning plate 26 and arranged to extend along the intake air flow direction from a position corresponding to the outside edge (23d, 23e) of the other end of the air intake control valve 20 (i.e., the end of the valve element 23 that is not connected to the valve shaft 22). As a result, at a prescribed rotational position (intermediate opening degree) of the valve shaft 22, the free outermost edge 23d of the side of the valve element 23 of the air intake control valve 20 where the swirl-producing notch 23c is not formed and the outer edge (bottom edge 23e) of the side of the valve element 23 of the air intake control valve 20 where the swirl-producing notch 23c is formed are each aligned with a different one of the horizontal partitioning plates 125. When the valve shaft 22 is in the prescribed rotational position, a gas flow motion that is matched to the engine conditions can be produced in a more stable manner, exhaust emissions can be reduced greatly, and the fuel economy can be greatly improved.

In this embodiment, the vertical partitioning plates 126 and the horizontal partitioning plates 125, form a section having a honeycomb-like structure. As a result, a stable gas flow can be produced at all times by adjusting the opening degree of the air intake control valve 20 in accordance with the operating conditions.

In this embodiment, the horizontal partitioning plates 125 are arranged and configured such that one of the horizontal partitioning plates 125 forms a continuous contour with respect to the free outermost edge 23d of the side of the other end of the valve element where the swirl-producing notch 23c is not formed when the valve shaft 22 is in a first prescribed rotational position, and a second of the horizontal partitioning plates 125 forms a continuous contour with respect to the bottom edge 23e of the side of the outer end 23b of the valve element 23 where the swirl-producing notch 23c is formed when the valve shaft 22 is in the prescribed rotational position. Additionally, the first horizontal partitioning plates 125 are connected together by the vertical partitioning plates 126. As a result, the air intake passage 13 is divided into sections by the horizontal partitioning plates 125, and the vertical partitioning plates 126 and a stable gas flow can be produced by adjusting the opening degree of the air intake control valve 20.

Fifth Embodiment

Figure 10:
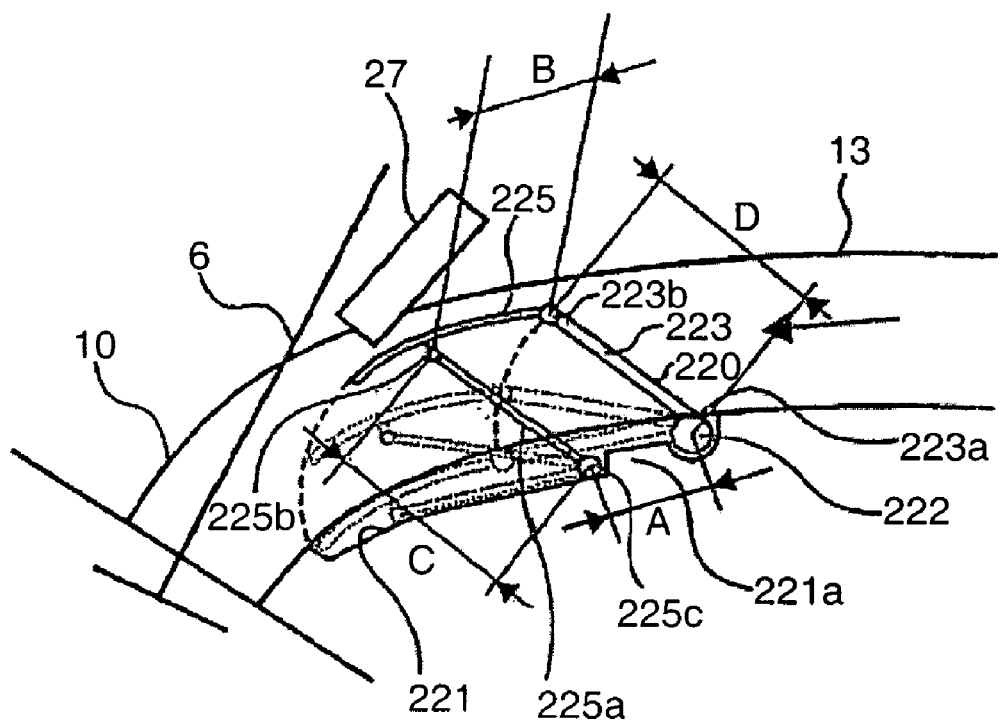
FIG. 10 is an enlarged, simplified longitudinal cross sectional view of a portion of the air intake passage in accordance with a fifth embodiment of the present invention.
Figure 11:
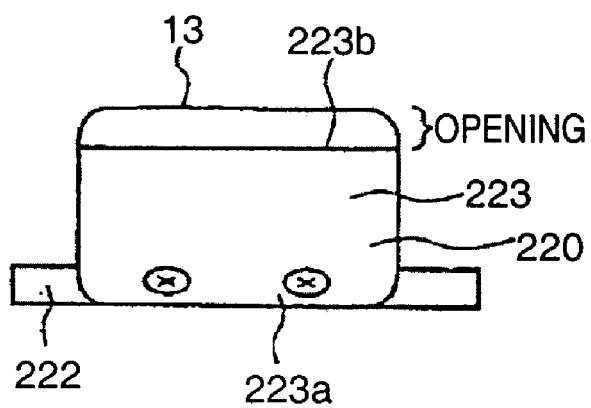
FIG. 11 is a simplified transverse cross sectional view of the portion of the air intake passage illustrated in FIG. 10 in accordance with the fifth embodiment of the present invention.

Referring now to FIGS. 10 and 11, an air intake structure is illustrated in accordance with a fifth embodiment. This air intake structure of the fifth embodiment replaces the air intake structure of the first embodiment that is shown in FIG. 1. In other words, the air intake structure of the fifth embodiment is installed in the internal combustion engine of FIG. 1. In view of the similarity between this embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

As shown in FIG. 10, an air intake control valve 220 (which is a tumble control valve in this embodiment) is moveably mounted to the air intake passage 13 for movement between a storage or open position within a storage compartment 221 of the air intake passage 13 and an air deflecting or closed position. In particular, the air intake control valve 220 includes a valve shaft 222 that supports a valve element 223. The air intake control valve 220 differs from the air intake control valve 20 of the prior embodiments in that there is no notch at the outer edge of the valve element 223. Thus, the air intake control valve 220 is a flap valve in which the valve shaft 222 is arranged in a turnable fashion from a prescribed position within a storage compartment 221 to an extended position that deflects the intake air to one side of the air intake passage 13. The valve element 223 is a rectangular plate-like element that is fixed to the valve shaft 222 at one end 223a thereof such it can turn about the rotational axis of the valve shaft 222. The other (free) end 223b of the valve element 223 is configured to be parallel to the upper wall of the air intake passage 13 and serves to control the gas flow in accordance with the rotational position of the valve element 223.

In this embodiment, a horizontal partitioning plate 225 is mounted to the free end 223b of the valve element 223 such that the valve element 223 and the horizontal partitioning plate 225 move together between the storage or open position within the storage compartment 221 of the air intake passage 13 and the air deflecting or closed position. The horizontal partitioning plate 225 is a horizontal plate-like member that is arranged so as to be oriented along the flow direction of the intake air in the air intake passage 13 and configured to have rectifying effect with respect to the flow of the intake air. Thus, the horizontal partitioning plate 225 is coupled at its upstream end to the free end 223b of the valve element 223 of the air intake control valve 220 in a freely pivoting manner. In other words, the free end 223b of the valve element 223 of the air intake control valve 220 is configured for coupling the horizontal partitioning plate 225 thereto. A link member 225a configured to function as a linking mechanism is arranged in such a manner as to maintain the horizontal partitioning plate 225 generally parallel to the upper wall of the air intake passage 13 (intake port 10). In particular, a four bar linkage is formed by the interconnections of the storage compartment 221, the valve element 223, the horizontal partitioning plate 225 and the link member 225a.

The link member 225a has an outer coupling end 225b that is coupled in a freely pivoting manner to the side of the horizontal partitioning plate 225 that is downstream of the valve element 223 of the air intake control valve 220. In other words, the end 225b of the link member 225a is configured as a coupling means for coupling to the other end (i.e., downstream end) of horizontal partitioning plate 225.

The link member 225a is arranged to pivot about the inner end 225c thereof when the valve element 223 of the air intake control valve 220 rotates. Meanwhile, the horizontal partitioning plate 225 moves in such a manner as to remain substantially oriented along the flow direction of the intake air, i.e., parallel to the flow direction of the intake air (i.e., to the upper wall of the air intake passage 13). As shown in FIG. 10, the inner end 225c of the link member 225a is abutted against a step-like part 221a formed in the storage compartment 221.

The linkage mechanism formed by the air intake control valve 220, the horizontal partitioning plate 225, and the link member 225a will now be explained.

As shown in FIG. 10, when the air intake control valve 220 is opened to an intermediate position, the link member 225a is parallel to the valve element 223 of the air intake control valve 220. The length A from the valve shaft 222 of the air intake control valve 220 to the inner end 225c of the link member 225a is equal to the length B from the coupling end 223b between the air intake control valve 220 and the horizontal partitioning plate 225 to the coupling end 225b between the horizontal partitioning plate 225 and the link member 225a (i.e., A=B). Additionally, the length D of the air intake control valve 220 (i.e., length from the valve shaft 222 to the inner end 225c) is equal to the length C of the link member 225a (i.e., length from the end 225b to the inner end 225c) (i.e., C=D).

The valve shaft 222 of the air intake control valve 220 can be turned (rotated) by the actuator 24 (servomotor). Thus, the opening and closing of the air intake passage 13 is controlled by controlling the actuator 24 and, thereby, controlling the rotational position of the valve shaft 222. When the valve shaft 222 is turned, the free end 223b of the valve element 223 of the air intake control valve 220 moves along a circular arc centered on the valve shaft 222.

For example, when the air intake control valve 220 is partially open as shown in FIG. 10, the intake air is directed into the cylinder 1 (see FIG. 1) from the opening section formed between the free end 223b of the valve element 223 of the air intake control valve 220 and the upper wall of the air intake passage 13, thereby producing a tumble flow.

Meanwhile, when the air intake control valve 220 is fully open, i.e., when the valve element 223 of the air intake control valve 220 is positioned so as to be parallel to the air intake passage 13, the valve element 223 is housed in the storage compartment 221. In this state, the flow resistance with respect to the intake air is reduced because the entire air intake control valve 220 is stored inside the storage compartment 221.

When the internal combustion engine is operating in a low rotational speed/low load region or a medium rotational speed/medium load region, the air intake control valve 220 is opened partially. The opening degree of the air intake control valve 220 under such conditions is determined based on the rotational speed and the load. The horizontal partitioning plate 225 moves up and down in accordance with the opening degree of the air intake control valve 220 while remaining parallel to the upper wall of the air intake passage 13 (intake port 10). In other words, since the opening degree of the air intake control valve 220 is determined in a continuously variable fashion based on the operating conditions, the horizontal partitioning plate 225 rectifies the intake air flow from a position corresponding to the operating conditions, enabling appropriate exhaust, fuel consumption, and output to be obtained simultaneously. In particular, the tumble flow can be strengthened in regions of low rotational speed and low load.

When the internal combustion engine is operating in a high rotational speed/high load region, the air intake control valve 220 is opened fully such that the air intake control valve 220, the horizontal partitioning plate 225, and the link member 225a, are stored inside the storage compartment 221 formed in the lower wall face of the air intake passage 13. Under these conditions, the flow resistance with respect to the intake air is reduced.

It is also acceptable to determine the opening degree of the air intake control valve 220 based on the temperature of the engine coolant. In such a case, the air intake control valve 220 would be closed to produce a strong tumble flow when the coolant temperature is low (i.e., when engine is cool) and opened so as to be stored in the storage compartment 221 when the coolant temperature is high (i.e., when engine is warm).

In this embodiment, the link member 225a is arranged in such manner as to be parallel to the valve element 223 of the air intake control valve 220. As a result, the position of the horizontal partitioning plate 225 can be raised and lowered in a stable manner.

In this embodiment, the length A from the valve shaft 222 of the air intake control valve 220 to the inner end 225c of the link member 225a is equal to the length B from the coupling end 223b between the air intake control valve 220 and the horizontal partitioning plate 225 to the coupling end between the horizontal partitioning plate 225 and the link member 225a (i.e., A=B). As a result, a stable linkage mechanism can be achieved.

In this embodiment, the length D of the air intake control valve 220 is equal to the length C of the link member 225a (i.e., C=D). As a result, the horizontal partitioning plate 225 can be kept parallel to the upper wall of the air intake passage 13 when it is moved by the linkage mechanism.

Sixth Embodiment

Figure 12:
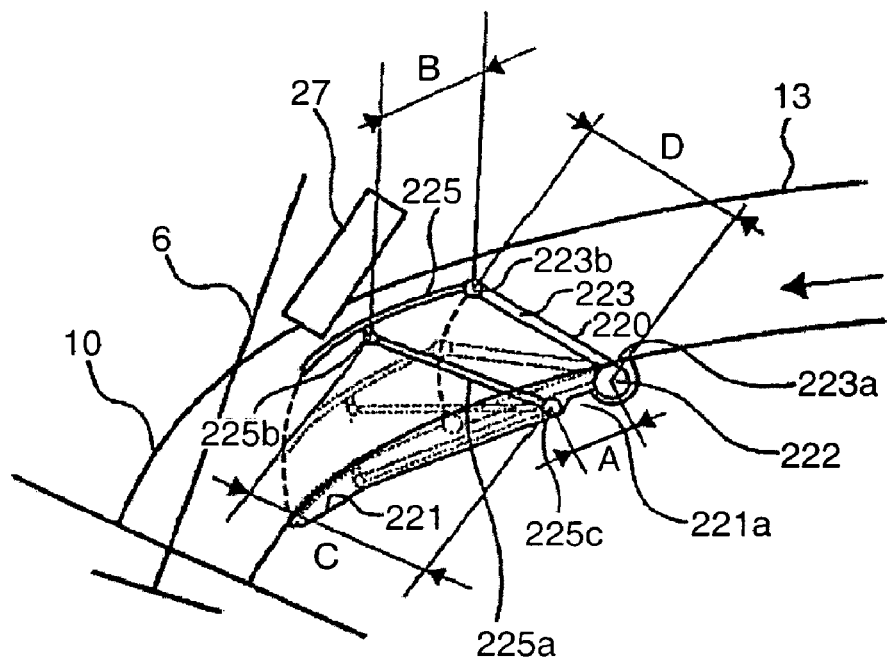
FIG. 12 is an enlarged, simplified longitudinal cross sectional view of a portion of the air intake passage in accordance with a sixth embodiment of the present invention.
Figure 13:
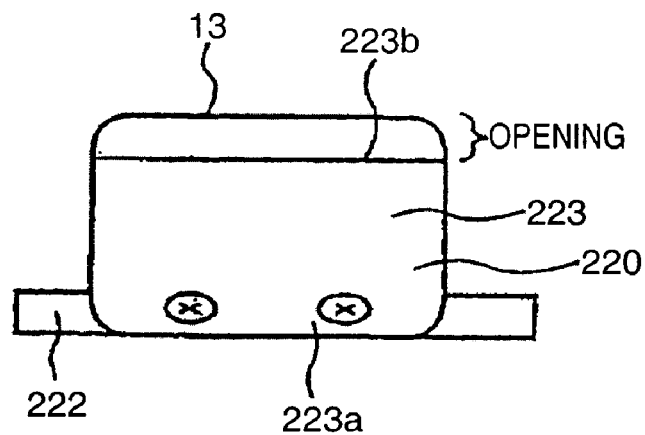
FIG. 13 is a simplified transverse cross sectional view of the portion of the air intake passage illustrated in FIG. 12 in accordance with the sixth embodiment of the present invention.

Referring now to FIGS. 12 and 13, an air intake structure is illustrated in accordance with a sixth embodiment. This air intake structure of the sixth embodiment replaces the air intake structure of the first embodiment that is shown in FIG. 1. In other words, the air intake structure of the sixth embodiment is installed in the internal combustion engine of FIG. 1. This air intake structure of the sixth embodiment is most similar to the fifth embodiment. In view of the similarity between this embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

In the sixth embodiment, the air intake control valve 220 is identical to the fifth embodiment, except for the geometry of the four bar linkage formed by the interconnections of the storage compartment 221, the valve element 223, the horizontal partitioning plate 225 and the link member 225a. In particular, in the sixth embodiment, the sum (A+C) of the length C of the link member 225a (from the outer coupling end 225b to the inner end 225c) and the length A from the valve shaft 222 of the air intake control valve 220 to the inner end 225c of the link member 225a is approximately equal to the sum (B+D) of the length D of the air intake control valve 220 and the length B from the coupling end 223b between the air intake control valve 220 and the horizontal partitioning plate 225 to the outer coupling end 225b between the horizontal partitioning plate 225 and the link member 225a (i.e., A+C≈B+D).

In FIG. 12, the length A from the valve shaft 222 of the air intake control valve 220 to the inner end 225c of the link member 225a is smaller than the length B from the coupling end 223b between the air intake control valve 220 and the horizontal partitioning plate 225 to the outer coupling end 225b between the horizontal partitioning plate 225 and the link member 225a (i.e., A<B).

Thus, the sum (A+C) of the length C of the link member 225a and the length A from the valve shaft 222 of the air intake control valve 220 to the inner end 225c of the link member 225a is smaller than the sum (B+D) of the length D of the air intake control valve 220 and the length B from the coupling end 223b between the air intake control valve 220 and the horizontal partitioning plate 225 to the outer coupling end 225b between the horizontal partitioning plate 225 and the link member 225a (i.e., A+C<B+D).

The linkage mechanism is thus configured such that the horizontal partitioning plate 225 is farther from the air intake passage 13 (intake port 10) when the air intake control valve 220 is open. This arrangement is particularly useful when the engine is configured such that the bottom wall of the air intake passage 13 is curved because the horizontal partitioning plate 225 can be aligned with the air intake passage 13 when the air intake control valve 220 is open without providing a step-like part.

Although not shown in the figures, it is also acceptable to configure the linkage mechanism such that the sum (A+C) of the length C of the link member 225a and the length A from the valve shaft 222 of the air intake control valve 220 to the inner end 225c of the link member 225a is smaller than the sum (B+D) of the length D of the air intake control valve 220 and the length B from the coupling end 223b between the air intake control valve 220 and the horizontal partitioning plate 225 to the outer coupling end 225b between the horizontal partitioning plate 225 and the link member 225a (i.e., A+C>B+D).

In such a case, the linkage mechanism would thus be configured such that the horizontal partitioning plate 225 is pushed toward the upper wall of the air intake passage 13 (intake port 10) when the air intake control valve 220 is open. Such an arrangement is particularly useful when the engine is configured such that the bottom wall of the air intake passage 13 has a straighter shape because the horizontal partitioning plate 225 can be aligned with the air intake passage 13 when the air intake control valve 220 is open without providing a step-like part.

Seventh Embodiment

Figure 14:
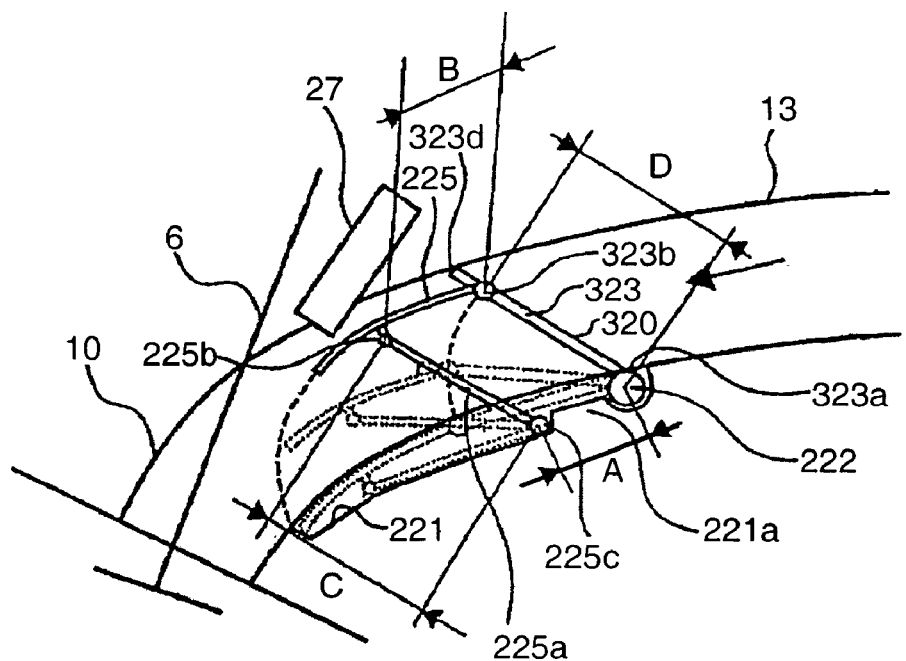
FIG. 14 is an enlarged, simplified longitudinal cross sectional view of a portion of the air intake passage in accordance with a seventh embodiment of the present invention.
Figure 15:
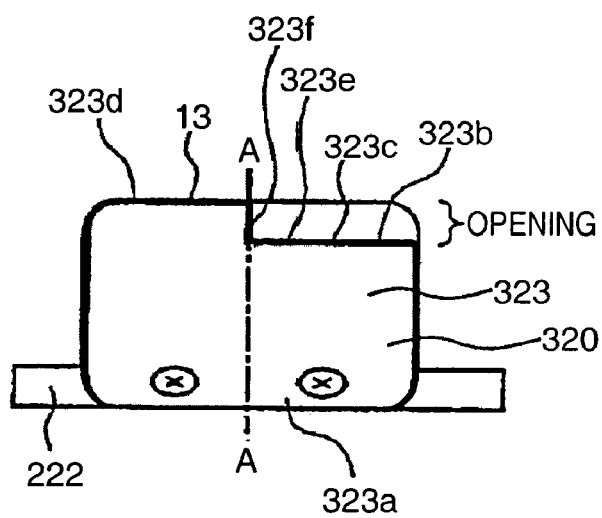
FIG. 15 is a simplified transverse cross sectional view of the portion of the air intake passage illustrated in FIG. 14 in accordance with the seventh embodiment of the present invention.

Referring now to FIGS. 14 and 15, an air intake structure is illustrated in accordance with a seventh embodiment. This air intake structure of the seventh embodiment replaces the air intake structure of the first embodiment that is shown in FIG. 1. In other words, the air intake structure of the seventh embodiment is installed in the internal combustion engine of FIG. 1. This air intake structure of the seventh embodiment uses the valve element of the first embodiment and the moveable horizontal partitioning plate with the four bar linkage of the fifth embodiment. In view of the similarity between this embodiment and the prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

In the seventh embodiment, an air intake control valve 320 is the same as the fifth embodiment, except for the valve element 223 has been replaced with the valve element 323 that is identical to the valve element 23 of the first embodiment. Thus, in the sixth embodiment, the air intake control valve 320 is a swirl control valve having the swirl-producing notch (cut out portion) 323c formed on the right side of the outer end 323b of the valve element 323, the swirl-producing notch 323c being configured so as to provide the valve element 323 with a bottom edge 323e and a side edge 323f. As shown in FIG. 15, the swirl-producing notch 323c is formed on the half of the outer end 323b of the valve element 323 located on the right side of the centerline of the valve element 323 (line A—A). The free outermost edge 323d of the side of the other end of the valve element 323 where the swirl-producing notch 323c is not formed is positioned farther from the valve shaft 222 than the bottom edge 323e formed by the swirl-producing valve 320.

The horizontal partitioning plate 225 is coupled in a freely pivoting manner the air intake control valve 320 at a position corresponding to the bottom edge 323e formed by the swirl-producing notch 323. A notch (not shown) is provided in the horizontal partitioning plate 225 so that the free outermost edge 323d of the side of the other end of the valve element 323 where the swirl-producing notch 323c is not formed will not interfere with the horizontal partitioning plate 225 when the air intake control valve 320 is fully open (i.e., when the air intake control valve 320 is stored in the storage compartment 221).

The length A from the valve shaft 222 of the air intake control valve 320 to the inner end 225c of the link member 225a is equal to the length B from the coupling end 323b between the air intake control valve 320 and the horizontal partitioning plate 225 to the outer coupling end 225b between the horizontal partitioning plate 225 and the link member 225a (i.e., A=B). Additionally, the length D of the air intake control valve 320 (i.e., length from the valve shaft 222 to the inner end 225c) is equal to the length C of the link member 225a (i.e., length from the end 225b to the inner end 225c) (i.e., C=D). Thus, the sum (A+C) of the length C of the link member 225a and the length A from the valve shaft 222 of the air intake control valve 320 to the inner end 225c of the link member 225a is equal to the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C=B+D).

The relationship between the opening and closing of the air intake control valve 320 and the load (operating conditions) of the engine in this embodiment will now be explained.

When the engine is operating in a low rotational speed/low load region, the air intake control valve 320 is closed fully (i.e., the air intake control valve 320 is at maximum slant angle). When the air intake control valve 320 is fully closed, the free outermost edge 323d of the side of the other end of the valve element 323 where the swirl-producing notch 323c is not formed touches against the upper wall of the air intake passage 13. Due to the horizontal partitioning plate 225, the intake air that passes through the swirl-producing notch 323c of the air intake control valve 320 is delivered into the cylinder 1 (see FIG. 1) the gas flow becoming turbulent. As a result, a strong swirl flow is produced.

When the engine is operating under in a medium rotational speed/medium load region, the air intake control valve 320 is opened partially (not shown) to an opening degree determined in accordance with the sizes of the rotational speed and the load. As a result, the opening degree of the air intake passage 13 can be varied in a continuously variable manner and turbulent gas flow can be prevented even at intermediate opening degrees of the air intake control valve 320.

When the engine is operating in a high rotational speed/high load region, the air intake control valve 320 is closed fully. When the air intake control valve 320 is fully closed, the air intake control valve 320 (valve element 323) is stored in the storage compartment 221 formed in the bottom wall of the air intake passage 13 and the flow resistance with respect to the intake air is reduced.

Eighth Embodiment

Figure 16:
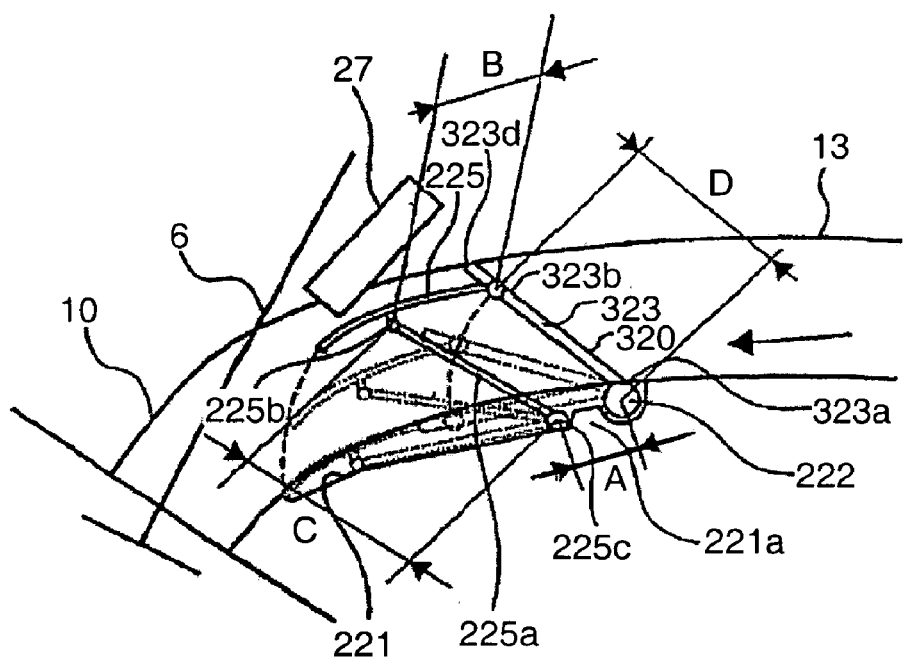
FIG. 16 is an enlarged, simplified longitudinal cross sectional view of a portion of the air intake passage in accordance with an eighth embodiment of the present invention.
Figure 17:
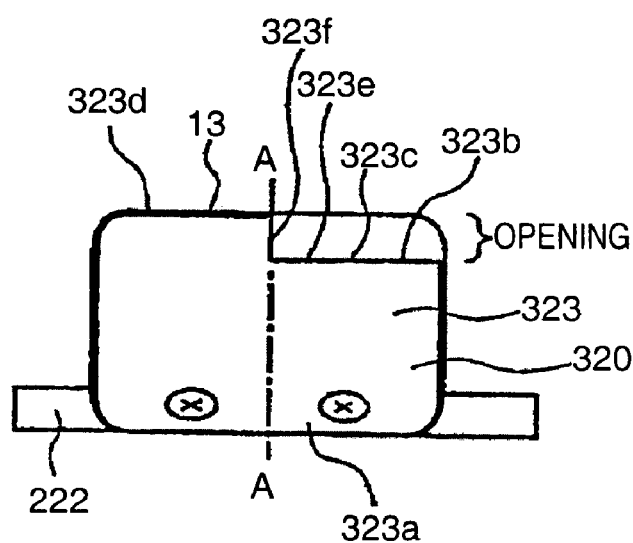
FIG. 17 is a simplified transverse cross sectional view of the portion of the air intake passage illustrated in FIG. 16 in accordance with the eighth embodiment of the present invention.

Referring now to FIGS. 16 and 17, an air intake structure is illustrated in accordance with an eighth embodiment. This air intake structure of the eighth embodiment replaces the air intake structure of the first embodiment that is shown in FIG. 1. In other words, the air intake structure of the eighth embodiment is installed in the internal combustion engine of FIG. 1. This air intake structure of the eighth embodiment uses the valve element of the first embodiment and the moveable horizontal partitioning plate with the four bar linkage of the sixth embodiment. In view of the similarity between this embodiment and the prior embodiments, the parts of the eighth embodiment that are identical to the parts of the prior embodiments will be given the same reference numerals as the parts of the prior embodiments. Moreover, the descriptions of the parts of the eighth embodiment that are identical to the parts of the prior embodiments may be omitted for the sake of brevity.

Similarly to the case shown in FIG. 12, an air intake control valve 320, as shown in FIG. 16, has a four bar linkage in which the sum (A+C) of the length C of the link member 225a and the length A from the valve shaft 222 of the air intake control valve 320 to the inner end 225c of the link member 225a is approximately equal to the sum (B+D) of the length D of the air intake control valve 320 (from the valve shaft 222 to the coupling end 323b) and the length B from the coupling end 323b between the air intake control valve 320 and the horizontal partitioning plate 225 to the outer coupling end 225b between the horizontal partitioning plate 225 and the link member 225a (i.e., A+C≈B+D) and the length A from the valve shaft 222 of the air intake control valve 320 to the inner end 225c of the link member 225a is smaller than the length B from the coupling end 323b between the air intake control valve 320 and the horizontal partitioning plate 225 to the outer coupling end 225b between the horizontal partitioning plate 225 and the link member 225a (i.e., A<B).

Thus, the sum (A+C) of the length C of the link member 225a and the length A from the valve shaft 222 of the air intake control valve 320 to the inner end 225c of the link member 225a is smaller than the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C<B+D).

The linkage mechanism is thus configured such that the horizontal partitioning plate 225 is farther from the air intake passage 13 (intake port 10) when the air intake control valve 320 is open. This arrangement is particularly useful when the engine is configured such that the bottom wall of the air intake passage 13 is curved because the horizontal partitioning plate 225 can be aligned with the air intake passage 13 when the air intake control valve 320 is open without providing a step-like part.

Although not shown in the figures, it is also acceptable to configure the linkage mechanism such that the sum (A+C) of the length C of the link member 225a and the length A from the valve shaft 222 of the air intake control valve 320 to the inner end 225c of the link member 225a is smaller than the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C>B+D).

In such a case, the linkage mechanism would thus be configured such that the horizontal partitioning plate 225 is pushed toward the upper wall of the air intake passage 13 (intake port 10) when the air intake control valve 320 is open. Such an arrangement is particularly useful when the engine is configured such that the bottom wall of the air intake passage 13 has a straighter shape because the horizontal partitioning plate 225 can be aligned with the air intake passage 13 when the air intake control valve 320 is open without providing a step-like part.

Ninth Embodiment

Figure 18:
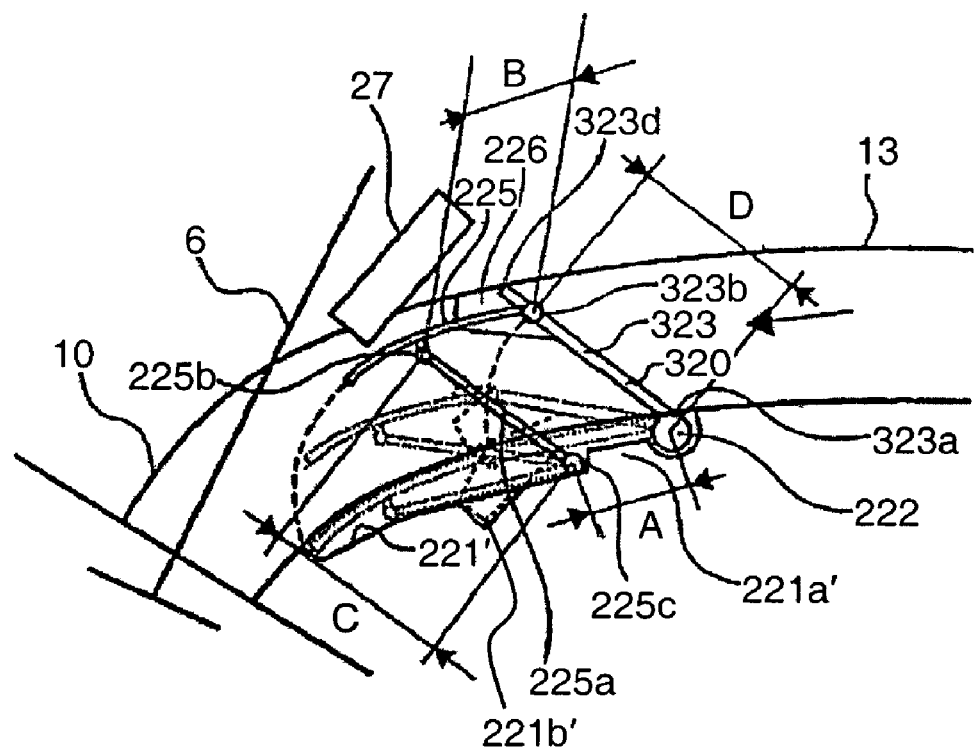
FIG. 18 is an enlarged, simplified longitudinal cross sectional view of a portion of the air intake passage in accordance with a ninth embodiment of the present invention.
Figure 19:
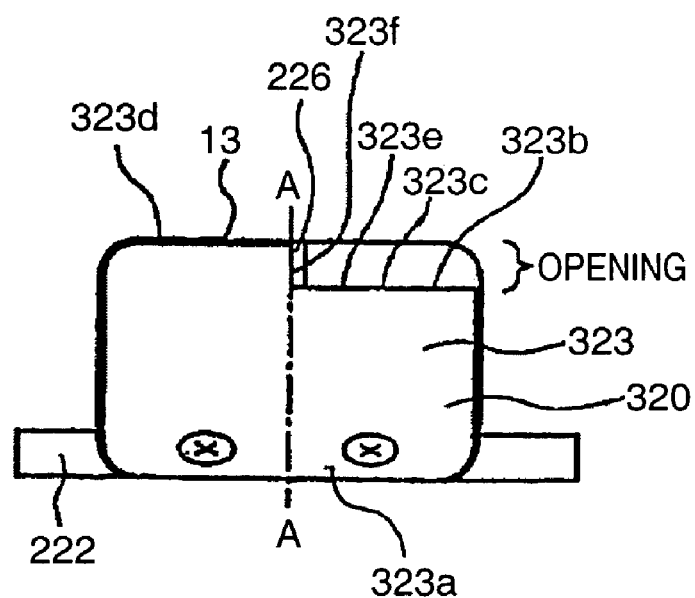
FIG. 19 is a simplified transverse cross sectional view of the portion of the air intake passage illustrated in FIG. 18 in accordance with the ninth embodiment of the present invention.

Referring now to FIGS. 18 and 19, an air intake structure is illustrated in accordance with a ninth embodiment. This air intake structure of the ninth embodiment replaces the air intake structure of the first embodiment that is shown in FIG. 1. In other words, the air intake structure of the ninth embodiment is installed in the internal combustion engine of FIG. 1. This air intake structure of the ninth embodiment has an air intake control valve 320 that is identical to the air intake control valve 320 of the seventh embodiment, except that a moveable vertical partitioning plate 226 has been added and a modified storage compartment 221' is used to accommodate the vertical partitioning plate 226. In view of the similarity between this embodiment and the prior embodiments, the parts of the ninth embodiment that are identical to the parts of the prior embodiments will be given the same reference numerals as the parts of the prior embodiments. Moreover, the descriptions of the parts of the ninth embodiment that are identical to the parts of the prior embodiments may be omitted for the sake of brevity.

In the ninth embodiment, the air intake control valve 320 has the vertical partitioning plate 226 mounted on the outer coupling end 323b of the valve element 323. Thus, the horizontal partitioning plate 225 and vertical partitioning plate 226 move together with the valve element 323. The vertical partitioning plate 226 is arranged to extend along the flow direction of the intake air from the side edge 323f (centerline of valve element 323 (line A—A)) formed by the swirl-producing notch 323c of the valve element 323 of the air intake control valve 320. The vertical partitioning plate 226 turns integrally with the valve element 323 when the valve element 323 turns about the valve shaft 222 (see FIG. 18). The storage compartment 221' is provided with a step portion 221a' as in some of the prior embodiments and a groove 221b' with a shape corresponding to the vertical partitioning plate 226 that serves to store the vertical partitioning plate 226 in the storage compartment 221' when the air intake control valve 320 is fully closed.

Similarly to the case shown in FIG. 14, the length A from the valve shaft 222 of the air intake control valve 320 to the inner end 225c of the link member 225a is equal to the length B from the coupling end 323b between the air intake control valve 320 and the horizontal partitioning plate 225 to the outer coupling end 225b between the horizontal partitioning plate 225 and the link member 225a (i.e., A=B). Additionally, the length D of the air intake control valve 320 (i.e., length from the valve shaft 22 to the inner end 225c) is equal to the length C of the link member 225a (i.e., C=D).

Tenth Embodiment

Figure 20:
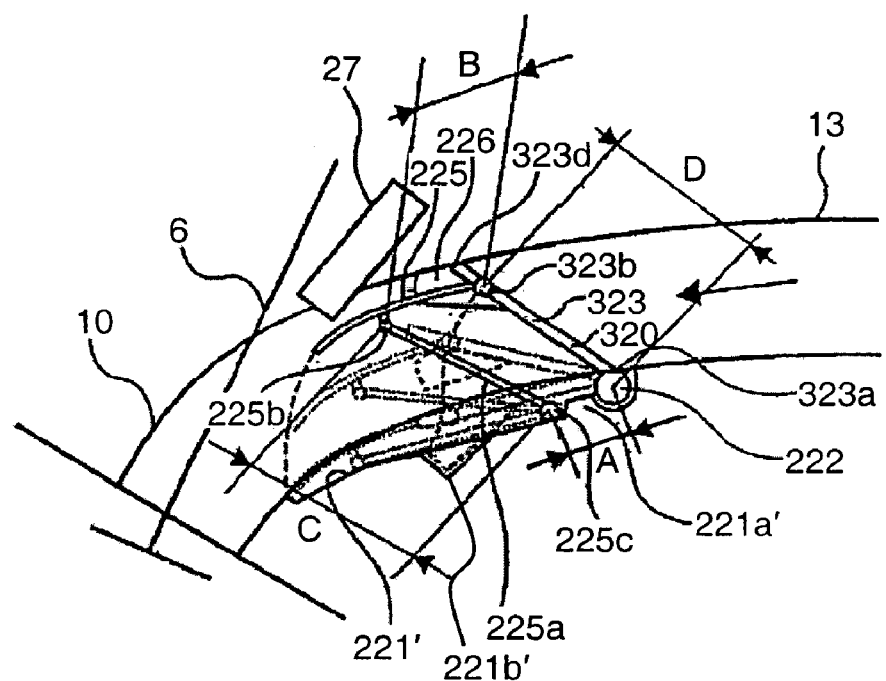
FIG. 20 is an enlarged, simplified longitudinal cross sectional view of a portion of the air intake passage in accordance with a tenth embodiment of the present invention.
Figure 21:
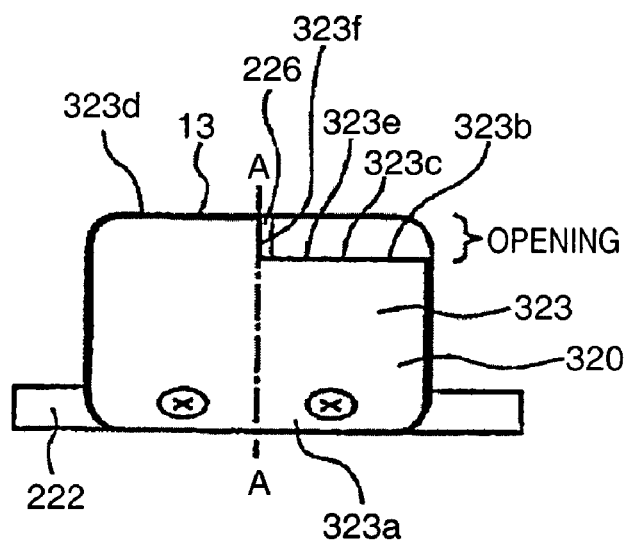
FIG. 21 is a simplified transverse cross sectional view of the portion of the air intake passage illustrated in FIG. 20 in accordance with the tenth embodiment of the present invention.

Referring now to FIGS. 20 and 21, an air intake structure is illustrated in accordance with a tenth embodiment. This air intake structure of the ninth embodiment has an air intake control valve 320 that is identical to the air intake control valve 320 of the eighth embodiment, except that a moveable vertical partitioning plate 226 has been added, similar to the ninth embodiment. In other words, the air intake control valve 320 that is identical to the air intake control valve 320 of the ninth embodiment, except that the four bar linkage of this embodiment uses the geometry of the eighth embodiment. Thus, similar to the preceding embodiments, the air intake structure of the tenth embodiment replaces the air intake structure of the first embodiment that is shown in FIG. 1. In other words, the air intake structure of the tenth embodiment is installed in the internal combustion engine of FIG. 1. In view of the similarity between this embodiment and the prior embodiments, the parts of the tenth embodiment that are identical to the parts of the prior embodiments will be given the same reference numerals as the parts of the prior embodiments. Moreover, the descriptions of the parts of the tenth embodiment that are identical to the parts of the prior embodiments may be omitted for the sake of brevity.

In the tenth embodiment, the air intake control valve 320 has the vertical partitioning plate 226 mounted on the outer coupling end 323b of the valve element 323, similar to the ninth embodiment. Thus, the horizontal partitioning plate 225 and vertical partitioning plate 226 move together with the valve element 323.

Similarly to the cases shown in FIGS. 12 and 16, the air intake control valve 320, as shown in FIG. 20, has a four bar linkage in which the sum (A+C) of the length C of the link member 225a and the length A from the valve shaft 222 of the air intake control valve 320 to the inner end 225c of the link member 225a is approximately equal to the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C≈B+D) and the length A from the valve shaft 222 of the air intake control valve 320 to the inner end 225c of the link member 225a is smaller than the length B from the coupling end 323b between the air intake control valve 320 and the horizontal partitioning plate 225 to the outer coupling end 225b between the horizontal partitioning plate 225 and the link member 225a (i.e., A<B).

Thus, the sum (A+C) of the length C of the link member 225a and the length A from the valve shaft 222 of the air intake control valve 320 to the inner end 225c of the link member 225a is smaller than the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C<B+D).

The linkage mechanism is thus configured such that the horizontal partitioning plate 225 is farther from the air intake passage 13 (intake port 10) when the air intake control valve 320 is open. This arrangement is particularly useful when the engine is configured such that the bottom wall of the air intake passage 13 is curved because the horizontal partitioning plate 225 can be aligned with the air intake passage 13 when the air intake control valve 320 is open without providing a step-like part.

Although not shown in the figures, it is also acceptable to configure the linkage mechanism such that the sum (A+C) of the length C of the link member 225a and the length A from the valve shaft 222 of the air intake control valve 320 to the inner end 225c of the link member 225a is smaller than the sum (B+D) of the length D of the air intake control valve 320 and the length B from the coupling end 323b between the air intake control valve 320 and the horizontal partitioning plate 225 to the outer coupling end 225b between the horizontal partitioning plate 225 and the link member 225a (i.e., A+C>B+D).

In such a case, the linkage mechanism would thus be configured such that the horizontal partitioning plate 225 is pushed toward the upper wall of the air intake passage 13 (intake port 10) when the air intake control valve 320 is open. Such an arrangement is particularly useful when the engine is configured such that the bottom wall of the air intake passage 13 has a straighter shape because the horizontal partitioning plate 225 can be aligned with the air intake passage 13 when the air intake control valve 320 is open without providing a step-like part.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine air intake structure comprising:

an air intake passage having an internal passage wall;

an air intake control valve disposed in the air intake passage to selectively move between a retracted position and an intake air deflecting position about a rotational axis that is positioned on one side of the air intake passage in a position closely adjacent to the internal passage wall of the air intake passage, the air intake control valve including a valve element with an inner end located at the rotational axis and an outer end having a swirl-producing notch with a bottom edge and a side edge, the rotational axis dividing the valve element into a first portion with the swirl-producing notch located on a first side of the rotational axis and a second portion located on a second side of the rotational axis with the first portion having a larger surface area than the second portion;

a first partitioning member longitudinally arranged within the air intake passage to generally extend parallel to an intake air flow direction of the intake air from a position corresponding to the bottom edge formed by the swirl-producing notch of the valve element when the air intake control valve is in the intake air deflecting position; and a second partitioning member arranged to form an angle with respect to the first partitioning member and to extend along the intake air flow direction from the side edge formed by the swirl-producing notch of the valve element, when the air intake control valve is in the intake air deflecting position.

2. The internal combustion engine air intake structure recited in claim 1, wherein the first partitioning member and the second partitioning member form a generally perpendicular L shape as seen in a cross sectional view of the air intake passage taken along a plane perpendicular to the intake air flow direction.

3. The internal combustion engine air intake structure recited in claim 1, wherein the first partitioning member is configured and arranged to extended in a widthwise direction and form an upside-down T-shape with the second partitioning member as seen in a cross sectional view of the air intake passage taken along a plane perpendicular to the intake air flow direction, and the first partitioning member includes a notch formed such that the first partitioning member does not interfere with an outer edge of the valve element where the swirl-producing notch is not formed when the air intake control valve is rotated to the intake air deflecting position.

4. The internal combustion engine air intake structure recited in claim 1, further comprising at least one supplemental partitioning member arranged substantially perpendicular to the second partitioning member and extending along the intake air flow direction from a position corresponding to the bottom edge formed by the swirl-producing notch of the valve element when the air intake control valve is in an intermediate prescribed intake air deflecting position.

5. The internal combustion engine air intake structure recited in claim 4, wherein
the first partitioning member, the second partitioning member and the at least one supplemental partitioning member are arranged so as to form a honeycomb-like structure.

6. The internal combustion engine air intake structure recited in claim 1, further comprising
at least one supplemental partitioning member arranged substantially parallel to the first partitioning member and extending along the intake air flow direction,
the first partitioning member being arranged and configured to form a continuous contour with respect to an outer edge of the outer end of the valve element where the swirl-producing notch is not formed when the air intake control valve is in an intermediate prescribed intake air deflecting position,
the at least one supplemental partitioning member being arranged and configured to form a continuous contour with respect to the bottom edge of the swirl-producing notch when the air intake control valve is in the intermediate prescribed intake air deflecting position, and
the first partitioning member and the at least one supplemental partitioning member being connected together by the second partitioning member.

7. The internal combustion engine air intake structure recited in claim 1, wherein
the second partitioning member has an upstream front edge that is aligned with the side edge formed by the swirl-producing notch, when the air intake control valve is the intake air deflecting position.

8. The internal combustion engine air intake structure recited in claim 1, wherein
the internal passage wall of the air intake passage includes a recess configured and arranged to store the valve element.

9. The internal combustion engine air intake structure recited in claim 8, wherein
the air intake control valve includes a valve shaft that is rotatable about the rotational axis with the valve shaft being disposed in a prescribed position in the recess of the internal passage wall.

10. The internal combustion engine air intake structure recited in claim 8, wherein
the air intake control valve is a flap valve having a valve shaft that is rotatable about the rotational axis and the valve element that is fixed to the valve shaft at one end, the valve element being retracted within the recess of the intake passage wall when the air intake control valve is in the retracted position.

11. The internal combustion engine air intake structure recited in claim 1, wherein
the first partitioning member is attached at an upstream part to the valve element at a connection point, and
the first partitioning member is supported by a first end of a link member at in a freely pivoting manner to the first partitioning member to define an outer pivot axis, with the link member being configured to maintain the first partitioning member substantially oriented along the intake air flow direction when the air intake control valve is moved between the retracted position and the intake air deflecting position.

12. The internal combustion engine air intake structure recited in claim 11, wherein
the link member has a second end pivotally mounted with respect to the internal passage wall of the air intake passage to define an inner pivot axis, and the link member is arranged parallel to the valve element of the air intake control valve.

13. The internal combustion engine air intake structure recited in claim 11, wherein
the rotational axis of the air intake control valve is spaced from the inner pivot axis of the link member by a first length that is substantially equal to a second length between the connection point formed between the valve element and the first partitioning member and the outer pivot axis formed between the first partitioning member and the link member.

14. The internal combustion engine air intake structure recited in claim 11, wherein
the valve element has a length as measured between the rotational axis of the air intake control valve and the first partitioning member that is substantially equal to a length of the link member as measured between the outer pivot axis formed between the first partitioning member and the link member and the inner pivot axis of the link member.

15. The internal combustion engine air intake structure recited in claim 11, wherein
the rotational axis of the air intake control valve is spaced from the inner pivot axis of the link member by a first length that is shorter than a second length between the connection point formed between the valve element and the first partitioning member and the outer pivot axis formed between the first partitioning member and the link member.

16. The internal combustion engine air intake structure recited in claim 11, wherein
the rotational axis of the air intake control valve is spaced from the inner pivot axis of the link member by a first length,
the connection point formed between the valve element and the first partitioning member and the outer pivot axis is spaced from the outer pivot axis formed between the first partitioning member and the link member by a second length,
the link member has a length of as measured between the outer pivot axis formed between the first partitioning member and the link member and the inner pivot axis of the link member,
the valve element has a length as measured between the rotational axis of the air intake control valve and the first partitioning member, and
the sum of the length of the link member and the first length between the rotational axis of the air intake control valve and the inner pivot axis of the link member is smaller than the sum of the length of the valve element and the second length between the outer pivot axis and the connection point formed between the valve element and the first partitioning member.

17. The internal combustion engine air intake structure recited in claim 11, wherein
the rotational axis of the air intake control valve is spaced from the inner pivot axis of the link member by a first length,
the connection point formed between the valve element and the first partitioning member and the outer pivot axis is spaced from the outer pivot axis formed between the first partitioning member and the link member by a second length, the link member has a length of as measured between the outer pivot axis formed between the first partitioning member and the link member and the inner pivot axis of the link member, the valve element has a length as measured between the rotational axis of the air intake control valve and the first partitioning member, and the sum of the length of the link member and the first length between the rotational axis of the air intake control valve and the inner pivot axis of the link member is larger than the sum of the length of the valve element and the second length between the outer pivot axis and the connection point formed between the valve element and the first partitioning member.

18. The internal combustion engine air intake structure recited in claim 11, wherein the internal passage wall of the air intake passage includes a recess configured and arranged to store the valve element.

19. An internal combustion engine air intake structure comprising:

means for forming an air intake passage having an internal passage wall;

air intake control means for producing a swirling flow of intake air on a combustion chamber side of the air intake control means in the air intake passage by deflecting the intake air towards one side of the air intake passage when the air intake control means is selectively rotated between a retracted position and an intake air deflecting position about a rotational axis that is positioned closely adjacent to the internal passage wall of the air intake passage, the rotational axis dividing a valve element of the intake control means into a first portion with a swirl-producing notch located on a first side of the rotational axis and a second portion located on a second side of the rotational axis with the first portion having a larger surface area than the second portion;

horizontal partitioning means for longitudinally dividing the air intake passage generally parallel to an intake air flow direction when the intake control means is in the intake air deflecting position; and vertical partitioning member means for further longitudinally dividing the air intake passage generally parallel to the intake air flow direction with respect to the first partitioning member, when the air intake control valve is in the intake air deflecting position.

20. A method of controlling intake air flow in an engine air intake passage comprising:

detecting an engine operating condition of an internal combustion engine;

selectively deflecting the intake air flowing in the engine air intake passage toward one side of the engine air intake passage by moving an air intake control valve disposed in the air intake passage between a retracted position and an intake air deflecting position about a rotational axis that is positioned on one side of the air intake passage in a position closely adjacent to an internal passage wall of the engine air intake passage, where the air intake control valve includes a valve element with an inner end located at the rotational axis and an outer end having a swirl-producing notch with a bottom edge and a side edge, the rotational axis dividing the valve element into a first portion with the swirl-producing notch located on a first side of the rotational axis and a second portion located on a second side of the rotational axis with the first portion having a larger surface area than the second portion; and maintaining a substantially constant cross sectional area reduction ratio along the air intake passage from a position adjacent swirl-producing notch a downstream position towards a combustion chamber using a horizontal partitioning member and a vertical partitioning member to longitudinally divide the air intake passage generally parallel to an intake air flow direction, where the cross sectional area reduction ratio refers to a ratio of the reduced open cross sectional area with respect to the total open cross sectional area of the air intake passage that results after cross sectional area is reduced.

* * * * *